Patented Apr. 30, 1935

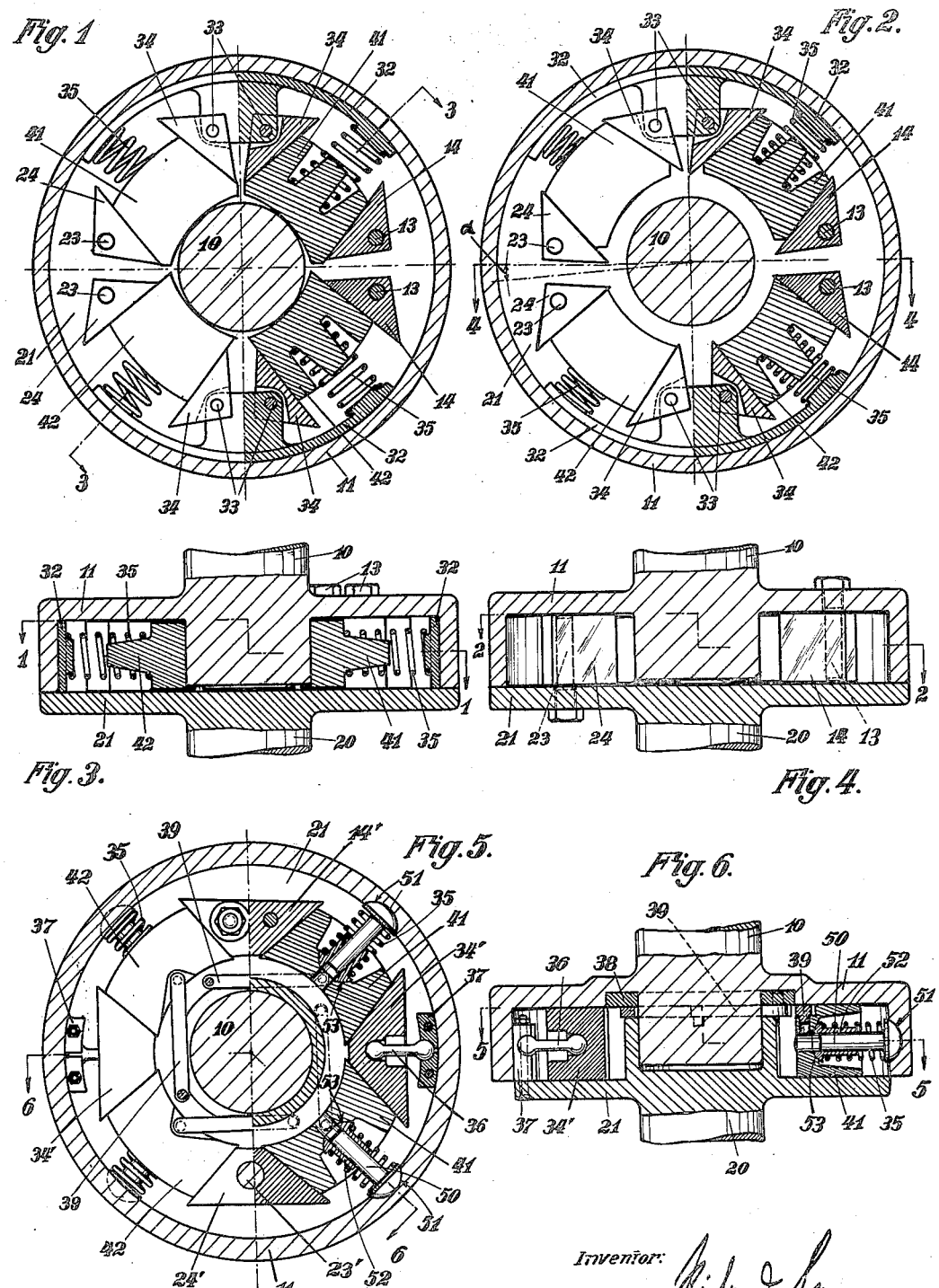

1,999,364

UNITED STATES PATENT OFFICE 1,999,364

SPEED CONTROLLED SHAFT COUPLING

Richard Lang, Ravensburg, Germany, assignor to Maybach-Motorenbau G. m. b. H., Friedrichshafen, Germany Application November 9, 1933, Serial No. 697,301. Renewed March 9, 1935. In Germany November 17, 1932

7 Claims. (Cl. 64—90.5)

My invention relates to controlling devices especially for auxiliary machines with motors and the like, for example for a fuel injection pump or an ignition apparatus on internal combustion engines.

A main object of my invention is a constant rigid driving connection between the motor driven shaft and the shaft driving the auxiliary device during normal periods of action, whereas the relative position of both shafts to each other in the direction of rotation is changed when the speed of rotation changes, this change in the relative position of the shafts taking place in the moment in which the driving force is at a minimum. During the other time no change in the relative position can take place because of the special design and construction of the controlling members according to my invention.

The invention is best understood when having reference to the drawing which represents two examples embodying my invention. Figs. 1, 2, 3 and 4 belong to the first example, whereas Figs. 5 and 6 show the second example.

Figs. 1, 2 and 5 are cross sections taken on lines 1, 2 and 5 of Figs. 3, 4 and 6, respectively; and Figs. 3, 4 and 6 are cross sections taken on lines 3, 4 and 6 of Figs. 1, 2 and 5, respectively.

In the example shown in Figs. 1, 2, 3 and 4, one of the two shafts is designated by the numeral 10, whereas 20 is the second shaft. Fixed to shaft 10 is sleeve 11 which carries members 14 journaled on bolts 13. Members 24 are journaled on bolts 23 fixed to disk 21 which is made integral with shaft 20. There are members 34 journaled on bolts 33, which are fixed to elements 32 adapted to slide inside of sleeve 11 without being fastened to parts of shafts 10 or 20. Weights 41 and 42 are inserted between members 14 and 34 and members 24 and 34, respectively. These weights 41 and 42 are adapted to move radially under the influence of the centrifugal force when the coupling mechanism rotates against the counter action of springs 35.

As will easily be understood from the drawing the side faces of the centrifugal weights 41 and 42 are sloped, but in different directions: the side faces of weights 41 diverge towards the centre of the shaft 10, whereas those of weights 42 converge in this direction. Consequently, it is apparent that on increasing speed of rotation of the shafts the weights 41 and 42 move outwardly from their neutral position shown in Figs. 1 and 3 into another position, for example that represented in Figs. 2 and 4. By this outward movement the relative position of shafts 10 and 20 in the sense of rotation is changed just a little as may be taken from angle α in Fig. 2.

I prefer to make centrifugal weights 41 heavier than weights 42, because weights 41 have to force their outward way between members 14 and 34 and members 24 and 34, respectively; whereas the outward way for weights 42 is open. Thus the centrifugal pressure of the heavier weights 41 causes constant touch between the adjacent members. The inclination of the sloping side faces of the weights is so chosen that the angle of friction is not surpassed, which means that the weights together with the intermediate members form a rigid transmitting construction which cannot yield as long as there is sufficient force transmitted through the coupling. But the weights are allowed to alter their radial position on a change of the speed of rotation in the moment when the driving force is at a minimum, thereby changing the relative position of the shafts, as explained above.

Figs. 5 and 6 show another modification of my invention. 10 and 20 again are the shafts connected by the coupling mechanism. There are the weights 41 and 42, but the member 14', 24' and 34', respectively, are not double but combined, as compared with the first example (Figs. 1, 2, 3 and 4). Member 14' is rigidly fixed to shaft 20; member 24' is journaled on bolt 23' fixed to disk 11; and members 34' are pivoted on one end of rods 36, the other end of which is again pivoted in elements 37 fixed to disk 21. Furthermore, there is angular element 38 surrounding the inner portion of shaft 10; and rods 39 journaled at both their ends, respectively, connect element 38 with each of the weights 41 and 42, thus causing an interconnecting link between the weights. Consequently, it cannot happen that one or the other of the weights should stay behind when the others move outwards or inwards, as circumstances may afford. The centrifugal weights 41 and 42 are again counteracted to by springs 35. Each of these springs this time surrounds a bolt 50, the ball shaped end of which is pivoted in an adequate recess 51 of sleeve 11. The other end of bolt 50 carries a slidable sleeve 52 having a ball shaped end fitting into recess 53 of each of the weights.

The operation of this modified example is analogous to the first described example: on an increase in speed of rotation the weights tend to move outwards and will do so when the driving force on the shafts comes to a minimum, thereby turning over a small angle one of the shafts in relation to the other shaft; but during driving conditions all the elements concerned form a rigid transmission.

I do not want to be limited to the details described or shown in the drawing as many variations will occur to those skilled in the art.

What I claim is:

1. A coupling mechanism of the kind comprising: two shafts substantially in alignment with each other; a plurality of centrifugal weights counteracted by springs; a number of said weights having side faces converging towards the common centre line of said shafts, the other weights having side faces diverging towards the centre line of said shafts; and a plurality of guiding members for the side faces of said weights, one of said guiding members being connected to one of said shafts, and another one of said guiding members being connected to the other one of said shafts.

2. A coupling mechanism as claimed in claim 1 further including the feature that the angle of inclination of the side faces of said weights lies within the friction angle of the materials concerned.

3. A coupling mechanism as claimed in claim 1 further characterized in that said weights diverging towards the common centre line of said shafts are heavier than said weights converging towards the centre line.

4. A coupling mechanism as claimed in claim 1 further including the feature that each of said guiding members except one is free to rotate around its bearing.

5. A coupling mechanism as claimed in claim 1 further including means for interconnecting said weights so as to cause their common outward or their common inward movement.

6. A coupling mechanism as claimed in claim 1 further including a loose angular member, and rods, one for each of said weights, connecting said weights to said angular member, said rods each being journaled with one end on said angular member and with its other end on one of said weights.

7. A coupling mechanism of the kind comprising: two shafts substantially in alignment with each other; an even number of centrifugal weights; springs adapted to counteract to said weights; half the number of said weights having side faces converging towards the common centre line of said shafts, the second half number of said weights having side faces diverging towards the centre line of said shafts, these latter weights being heavier than said first mentioned weights; an even number of guiding members for the side faces of said weights, one of said members being in rigid connection with one of said shafts, a second one of said members being rotatably mounted on a pin in rigid connection with the other one of said shafts, the rest of said guiding members being adapted each to swing around their respective bearings; a loose angular member; and rods, one for each of said weights, connecting said weights to said angular member, said rods each being journaled with one end on said angular member and with its other end on one of said weights.

RICHARD LANG.